US007088712B2

(12) United States Patent
Vierling

(10) Patent No.: US 7,088,712 B2
(45) Date of Patent: Aug. 8, 2006

(54) CALL DATA AND HARDWARE CACHE FOR A DIAL-UP ACCESS CONCENTRATOR

(75) Inventor: Michael David Vierling, San Francisco, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 943 days.

(21) Appl. No.: 09/894,797

(22) Filed: Jun. 28, 2001

(65) Prior Publication Data

US 2003/0035418 A1   Feb. 20, 2003

(51) Int. Cl.
*H04Q 11/00*   (2006.01)
(52) U.S. Cl. ...................................... 370/362; 370/463
(58) Field of Classification Search ........... 370/395.21, 370/463, 362, 375, 363, 378, 379, 395.2, 370/395.31
See application file for complete search history.

(56) References Cited

U.S. PATENT DOCUMENTS

| 5,349,579 | A  | * | 9/1994 | Madonna et al. ............ 370/259 |
| 6,195,714 | B1 | * | 2/2001 | Li et al. ........................ 710/31 |
| 6,260,071 | B1 | * | 7/2001 | Armistead et al. .......... 709/238 |
| 6,275,493 | B1 | * | 8/2001 | Morris et al. ............. 370/395.4 |
| 6,347,075 | B1 | * | 2/2002 | Barzegar et al. ............ 370/228 |
| 6,529,959 | B1 | * | 3/2003 | Armistead et al. .......... 709/238 |
| 6,603,757 | B1 | * | 8/2003 | Locascio ..................... 370/352 |
| 6,741,599 | B1 | * | 5/2004 | Dunn et al. ............... 370/395.6 |

OTHER PUBLICATIONS

General DataComm Network Access Division, "CSU/DSU Non-integrated vs. Router-Integrated," 2000, pp. 1-8, General DataComm Network Access Division, Middlebury, Connecticut.

* cited by examiner

*Primary Examiner*—Kwang Bin Yao

(57) ABSTRACT

The call data and hardware cache for a dial-up access concentrators caches the hardware device setup and the communication connection data created for a call connection for use in the next successively received incoming call. The call data and hardware cache for dial-up access concentrators enables the existing physical hardware connection that comprises the call connection in the dial-up access concentrator, the call processing and call connection resources to remain available for use in the next successively received incoming call. This step also retains the communication connection data comprising the call setup and call management data in the shelf controller and the call processing data in the call signal processor card for possible reuse. If the next received incoming call is substantially similar in characteristics to the last terminated call, then the existing "on-hold" signal processing card and shelf controller data as well as the TDM connections therebetween can be reused with minor modifications to serve the incoming call. This reduces the time required to setup a communication connection for the received call and reduces the need for CPU resources.

12 Claims, 3 Drawing Sheets

CALL DATA AND HARDWARE CACHE FOR A DIAL-UP ACCESS CONCENTRATOR

FIELD OF THE INVENTION

This invention relates to dial-up access concentrators and a call data and hardware cache for use in a dial-up access concentrator which improves the performance of the dial-up access concentrator by caching both the hardware setup to service a call connection and the data created for this call connection for use in setting up a call connection for the next successively received incoming call.

PROBLEM

It is a problem in the field of dial-up access concentrators that these systems presently can handle a predetermined number of calls per second. The typical dial-up access concentrator comprises what is termed a "shelf" of equipment that includes a shelf controller, a plurality of signal processor cards and a plurality of line cards. Each card in the shelf is typically a self-contained element, with its own processor and memory, that is independent of but cooperatively operative with the other cards and the shelf controller. In particular, the shelf controller serves to manage the flow of data between the line cards and the signal processor cards via a Time Division Multiplexed (TDM) bus to thereby route data from an incoming call connection on a line card to the signal processor card for formatting and thence to an outgoing call connection on a line card or routes the data to an egress card such as an Ethernet card.

Each line card terminates a communication trunk, such as a T1 line or a T3 line, that serves multiple call connections. The line card handles both call setup and call termination signaling on the incoming communication trunk and does not process the call connection signaling internal to the dial-up access concentrator. The shelf controller communicates with the line card in response to receipt of an incoming call connection and establishes a TDM connection to an available signal processor card to enable the line card to communicate with the signal processor card, which performs the packet level call setup including Point-to-Point Protocol (PPP) formatting and Point-to-Point Protocol authentication. In this process, the shelf controller expends a significant amount of CPU resources and exchanges numerous messages with both the line card and the signal processor card to establish the TDM link therebetween.

Each time a dial-up access concentrator call connection terminates, all of the call setup and call management data is flushed from both the shelf controller and the signal processor card to deconstruct the prior call connection, including the TDM link between the line card(s) and the signal processor card. This includes generating and transmitting signals to the TDM hardware to disconnect the channel that serves the line card and the associated signal processor card. However, the next received incoming call connection is typically highly correlated with the previous call connection and the processing implemented by the dial-up access concentrator for the prior call connection is repeated for this new call connection. Therefore, the shelf controller, signal processor card, and the TDM hardware all repeat the same tasks seriatim for each incoming call, with no efficiency obtained in the dial-up access concentrator by the prior experience of the call setup.

SOLUTION

The above-described problems are solved and a technical advance achieved by the present call data and hardware cache for a dial-up access concentrators which improves the performance of the dial-up access concentrator by caching the hardware device setup and the communication connection data created for a call connection for use in the next successively received incoming call. When the line card recognizes the termination of a call connection, it typically transmits an "INACTIVE" message to the shelf controller to enable the existing call connection to be deconstructed. However, the call data and hardware cache for dial-up access concentrators aborts the INACTIVE message to enable the existing physical hardware connection that comprises the call connection in the dial-up access concentrator, the call processing and call connection resources to remain available for use in the next successively received incoming call. This step also retains the communication connection data comprising the call setup and call management data in the shelf controller and the call processing data in the call signal processor card for possible reuse.

If the next received incoming call is substantially similar in characteristics to the last terminated call, then much of the call setup processing and hardware setup done for the prior call connection can be reused by the dial-up access concentrator. The existing "on-hold" signal processing card and shelf controller data as well as the TDM connections therebetween can be reused with minor modifications to serve the incoming call. This reduces the time required to setup a communication connection for the received call and reduces the need for CPU resources. If the next received incoming call was not able to use the prior call data, the standard call deconstruction process is activated, thereby expending no additional dial-up access concentrator resources to implement this process.

DETAILED DESCRIPTION

Figure 1:
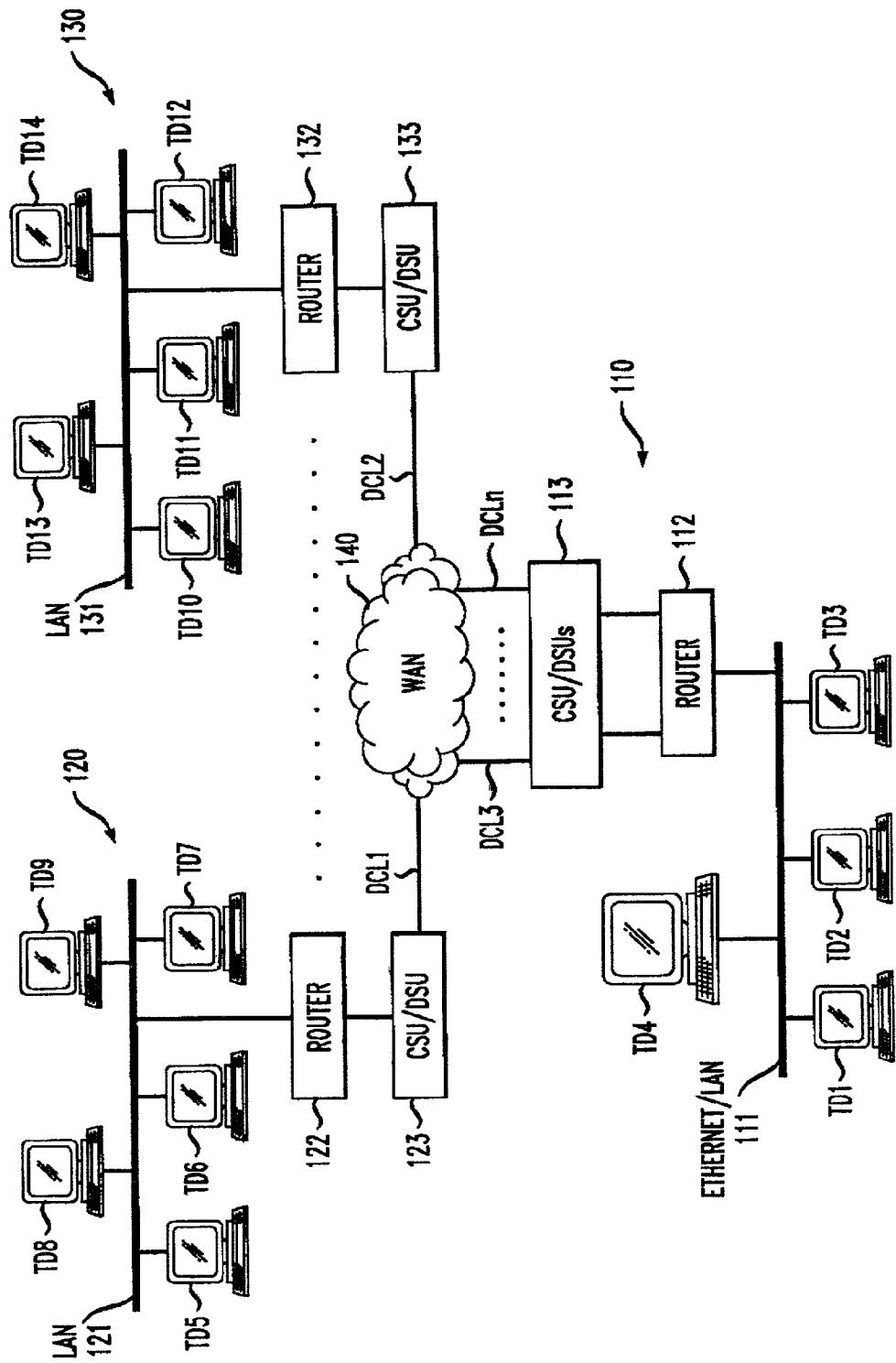
FIG. 1 illustrates in block diagram form the overall architecture of a data network that makes use of the call data and hardware cache for dial-up access concentrators.

FIG. 1 illustrates in block diagram form the overall architecture of a data network 100 that makes use of the call data and hardware cache for dial-up access concentrators. The dial-up access concentrator is a subsystem used to serve high-speed Local Area Network-attached applications and to provide the associated Wide Area Network (WAN) access for Internet and Intranet services. A routed networking feature is frequently used in business organizations and the digital Wide Area Network infrastructure circuits used therein operate at speeds ranging from the DDS service of 56 Kbps to the T1 and Fractional T1 service of 1.544 Mbps and to the T3 service of 45 Mbps.

In the data network 100 of FIG. 1, a Wide Area Network 140 interconnects a plurality of Local Area Networks 110, 120, 130, each of which serves a plurality of terminal devices TD1–TD14. In each Local Area Network 110, 120, 130, the terminal devices TD1–TD14 are interconnected by a data bus 111, 121, 131 respectively, which are also connected to a corresponding router 112, 122, 132. The routers 112, 122, 132 each interface with a Channel Service Unit and/or Data Service Unit termed "dial-up access concentrator" 113, 123, 133 herein. The dial-up access concentrators 113, 123, 133 serve to interconnect the LAN-connected terminal devices TD1–TD14 to the Wide Area Network 140, to implement Intranet and/or Internet services. The dial-up access concentrators 113, 123, 133 are connected to the Wide Area Network 140 by a plurality of data communication links DCL1–DCLn which are the DDS, T1 or Fractional T1 and T3 circuits. The routers 112, 122, 132 each function to take the data signals from the terminal devices TD1–TD14, such as terminal device TD1 that is served by router 112 of the Local Area Network 110, and determine the identity of the destination for these signals. Where the destination is another one (TD2) of the terminal devices TD1–TD4 served by the Local Area Network 110, the router 112 assigns an idle time slot on the data bus 111 to carry the data transmission to the identified destination terminal device TD2. Where the destination is a terminal device TD14 served by another Local Area Network 130 (or another destination served by the Wide Area Network 140), the router 112 forwards the received data signals to the dial-up access concentrator 113 for transmission via Wide Area Network 140 to the Local Area Network 130 that serves the destination terminal device TD14.

Figure 2:
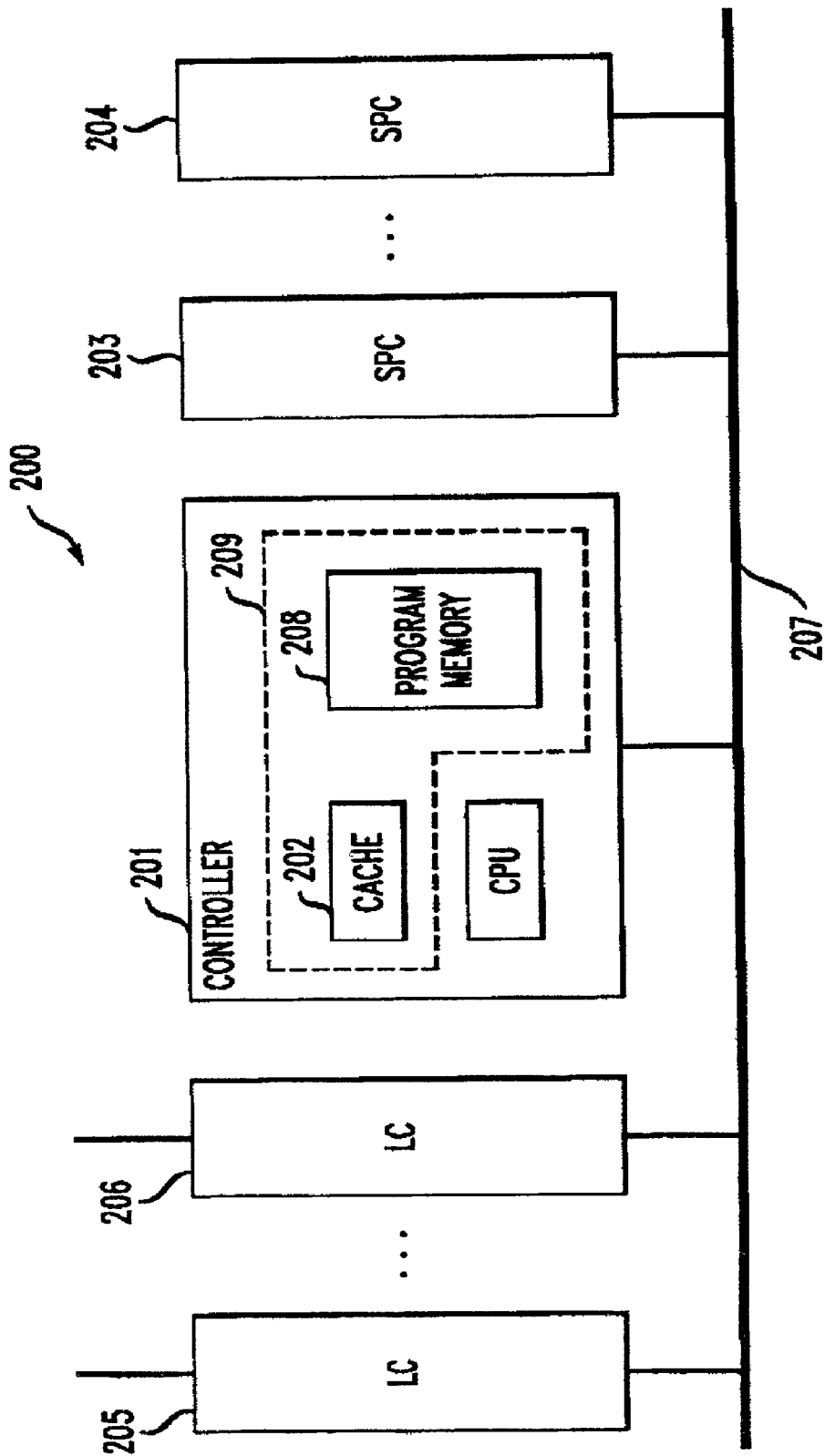
FIG. 2 illustrates in block diagram form the overall architecture of a dial-up access concentrator that incorporates the call data and hardware cache for dial-up access concentrators.
Figure 3:
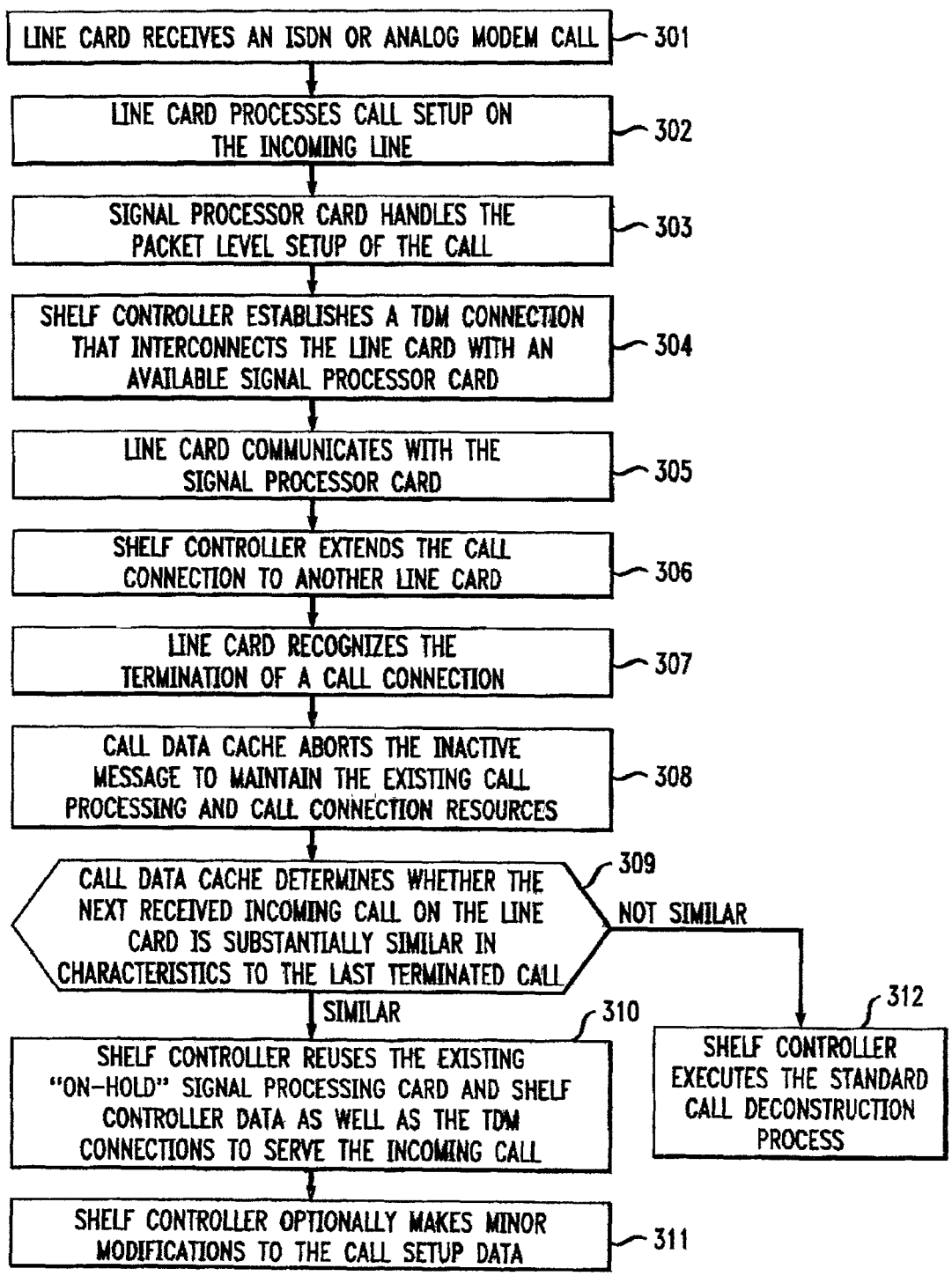
FIG. 3 illustrates in flow diagram form the overall operation of the call data and hardware cache for dial-up access concentrators in processing successively received incoming call connections.

FIG. 2 illustrates in block diagram form the overall architecture of a dial-up access concentrator 200 that incorporates the call data and hardware cache for dial-up access concentrators 209 and FIG. 3 illustrates in flow diagram form the overall operation of the call data and hardware cache for dial-up access concentrators 209 in processing successively received incoming call connections. The dial-up access concentrator 200 includes a shelf controller 201 equipped with a cache memory 202, a plurality of signal processor cards 203-204 and a plurality of line cards 205–206. Each card in the shelf is typically a self-contained element, with its own processor and memory, that is independent of but cooperatively operative with the other cards and the shelf controller. In particular, the shelf controller 201 serves to manage the flow of data between the line cards 205-206 and the signal processor cards 203–204 via a Time Division Multiplexed (TDM) bus 207 to thereby route data from an incoming call connection on a line card 205 to the signal processor card 203 for formatting and thence to an outgoing call connection on a line card 206. The present call data and hardware cache 209 comprises the cache memory 202 of the shelf controller 201 as well as program instructions 208 that execute on the shelf controller 201 to perform the operations described herein. The call data and hardware cache 209 can be distributed among the elements of the dial-up access concentrator 200 in a manner that differs from that described herein, and the present description is intended to describe the operation of the call data and hardware cache of the dial-up access concentrator, not to limit the scope of possible implementations.

Each line card 205–206 terminates a communication trunk, such as a T1 line or a T3 line, that serves multiple call connections. At step 301, a line card 205 receives an ISDN or analog modem call on a T1 or T3 line card. The line card 205 only handles the call setup and call termination signaling on the T1 line at step 302 and does not process call setup in the other direction, to the other elements of the dial-up access concentrator 200. The signal processor card 203 is equipped with a Digital Signal Processor (DSP) which handles the packet level setup of the call at step 303, including Point-to-Point Protocol (PPP) formatting and Point-to-Point Protocol authentication, in response to a message from the line card 205 indicative of an incoming call. This call setup data is stored in a cache memory 202, typically resident on the shelf controller 201 or on both the shelf controller 201 and signal processor card 203. The shelf controller 201 at step 304 establishes a TDM connection that interconnects the line card 205 with an available signal processor card 203 to enable the line card 205 to communicate at step 305 with the signal processor card 203. The shelf controller 201 then extends the call connection from the signal processor card 203 to another line card 206 at step 306, in well-known fashion, to output the received signals to the designated destination. In this process, the shelf controller 201 expends a significant amount of CPU resources and exchanges numerous messages with both the line card(s) 205–206 and the signal processor card 203 to establish the TDM link therebetween.

In existing dial-up access concentrators, each time a dial-up access concentrator call connection terminates, whether an incoming call or an outgoing call, the hardware that serves the call connection is programmed to disconnect and all of the communication connection data, comprising call setup and call management data, is flushed from both the shelf controller and the signal processor card to deconstruct the prior call connection, including the TDM link between the line card(s) and the signal processor card. However, the next received incoming call connection is typically highly correlated with the previous call connection and the processing implemented by the dial-up access concentrator for the prior call connection is repeated for this new call connection. Therefore, the shelf controller and signal processor card repeat the same tasks seriatim for each incoming call, with no efficiency obtained in the dial-up access concentrator by the prior experience of the call setup.

In the present call data and hardware cache 209, when the line card 205 recognizes the termination of a call connection at step 307, it typically transmits an "INACTIVE" message to the shelf controller 201 to enable the call connection to be deconstructed. However, the call data and hardware cache 209 for dial-up access concentrators aborts the INACTIVE message at step 308 to enable the existing physical hardware connection that comprises the call connection in the dial-up access concentrator, the call processing and call connection resources to remain available for use in the next successively received incoming call. This step also retains the communication connection data comprising the call setup and call management data in the shelf controller and the call processing data in the call signal processor card for possible reuse. Thus, this step retains the TDM links and any hardware setup as well as all communication connection data, comprising the call setup and call management data, in the cache memory 202 for reuse by the shelf controller 201 and the call processing data for reuse by the signal processor card 203.

If the next received incoming call on the line card 205 is substantially similar in characteristics to the last terminated call, as determined by the call data and hardware cache 209 of the shelf controller 201 at step 309, then much of the call setup processing done for the prior call connection can be reused by the dial-up access concentrator 200. The existing "on-hold" signal processing card 203 and shelf controller data as well as the TDM connections therebetween can be reused at step 310 by the shelf controller 201 with minor modifications at step 311 to serve the incoming call. This reduces the need for CPU resources, hardware setup and teardown, and, if the next received incoming call was not able to use the prior call data, the standard call deconstruction process is activated at step 312, thereby expending no additional dial-up access concentrator resources to implement this process.

The call data and hardware cache of the dial-up access concentrator system can cache the entire communication connection setup and management session as describer above. This requires looking at some of the fields in the call structure to make sure the call was substantially similar. Alternatively, the dial-up access concentrator can cache only essential session state information on the shelf controller. Then, all call TDM setups, regardless of type, can be cached as long as the call only uses one TDM channel. The TDM connection (i.e. physical connection) between line card and signal processor card is setup and remains setup even after the call goes away. When the next call arrives this same TDM connection is reused. Some parts of the software shelf state are reused as well. Setting up a call requires routing the call to a line card. This "call route" would also be reused and thus save software CPU cycles on the shelf controller.

The following illustrates a typical example of the data generated in the processing of a call connection:

Thus, the system maintains call setup data and a description of the connection to the Wide Area Network. The call setup data consists of the definition of the communication link from the terminal device through the dial-up access concentrator to the selected communication link to the Wide Area Network. This call setup data includes the destination telephone number, identification of the shelf in the dial-up access concentrator, identification of the line card, signal processor card, and the particular TDM channel used in this shelf. The description of the connection to the Wide Area Network consists of the identity of the selected communication link, the number of channels used, the selected channel on this selected communication link, as well as an indication of the availability of other idle channels on this selected communication link.

SUMMARY

The call data and hardware cache for a dial-up access concentrators improves the performance of the dial-up access concentrator by caching the data created for a call connection for use in the next successively received incoming call. If the next received incoming call is substantially similar in characteristics to the last terminated call, then

```
    memset( msg, 0, sizeof *msg );
    msg->msgType = htonl( NETIF_REQUEST_CALL );
    msg->u.requestInfo.callID = htonl( callID );
    msg->u.requestInfo.callID_tag = htonl( callID_tag );
    msg->u.requestInfo.routeID = htonl( routeID.id );
    msg->u.requestInfo.netIF = htonl( CALLID_NET_TYPE( callID ) );
    /* copy CallSetupParams values... */
    CallSetupParamsInfo *msCallSetup = &msg->u.requestInfo.callSetup;
    memcpy( msCallSetup->phoneNumber, "3",
            MAX_USER_NUMBER_LENGTH + 1 );
    memcpy( msCallSetup->infoNumber, "",
            MAX_ANI_INFO_LENGTH + 1 );
    memcpy( msCallSetup->clidNumber, "",
            MAX_USER_NUMBER_LENGTH + 1 );
    memcpy( msCallSetup->billingNumber, "",
            MAX_BILLING_NUMBER_LENGTH + 1 );
#   if ( NETIF & ( T1 | E1 ))
    memcpy( msCallSetup->transitNumber, "",
            MAX_TRANSIT_NUMBER_LENGTH + 1 );
    msCallSetup->callByCallValue = htons( 0 );
    msCallSetup->calledNumberType = htonl( NAT_NUMBER );
#   endif
    msCallSetup->switchedCallType   = htonl( SWITCHED_CLEAR_56 );
    msCallSetup->dstGlobDsl         = htonl( 2 );
    msCallSetup->isPortToNT         = FALSE;
    msCallSetup->isNetToNet         = FALSE;
    msCallSetup->mateShelfNumber    = htonl( TNT_SHELF_ANY );
    msCallSetup->mateSlotNumber     = htonl( SLOT_NUMBER_NONE );
    msCallSetup->mateSlotDsl        = 0;
    msCallSetup->mateFirstChannel   = 0;
    msCallSetup->isSS7Call = htonl( FALSE );
    /* copy ConnectionDesc values... */
    ConnectionDescInfo* msConnDesc = &msg->u.requestInfo.connDesc;
    msConnDesc->service = htonl( 1 );
    memcpy( msConnDesc->phoneNumber, "3",
            MAX_PHONE_NUMBER_LENGTH + 1 );
    msConnDesc->numberOfChannels  =htons( 1 );
    msConnDesc->line              =htons( 0x1ff );
    msConnDesc->channel           =htons( 0 );
    msConnDesc->quantityAvailable =htonl( 1 );
    PRINTF(( "NETIF: callGen sendMsg\n" ));
    sendMsg(__netifMailbox, taskMsg );
``` much of the call setup processing done for the prior call connection can be reused by the dial-up access concentrator.

What is claimed:

1. A call data and hardware cache for improving the performance of a dial-up access concentrator, which comprises a shelf controller, a plurality of signal processor cards and a plurality of line cards, by caching the call data created for a call connection for use in the next successively received incoming call, comprising:
    cache memory means for storing communication connection data, including hardware device setup and the communication connection data created for a call connection, that serves to interconnect an incoming call connection that appears on a one of said plurality of line cards with a one of said plurality of signal processor cards;
    means for detecting conclusion of a call connection on said one of said plurality of line cards;
    means, responsive to said call conclusion, for aborting deconstruction of the existing call connection;
    means for maintaining physical hardware connections that interconnect said one line card to said one signal processor card, the associated call processing and call connection resources, and the associated said communication connection data in said cache memory means;
    means, responsive to receipt of a successive incoming call connection on said one line card, for determining whether said physical hardware connection and associated stored communication connection data can be used to serve said successive incoming call connection.

2. The call data and hardware cache of claim 1 further comprising:
    means, responsive to a determination that said communication connection and associated stored communication connection data can be used to serve said successive incoming call connection, for activating a call connection for said successive incoming call connection using said communication connection and associated communication connection data in said cache memory means.

3. The call data and hardware cache of claim 2 further comprising:
    means for modifying said communication connection and associated stored communication connection data to activate said call connection for said successive incoming call connection using said communication connection and associated communication connection data in said cache memory means.

4. The call data and hardware cache of claim 1 further comprising:
    means, responsive to a determination that said communication connection and associated stored communication connection data can not be used to serve said successive incoming call connection, for deconstructing said communication connection and purging said communication connection data from said cache memory means.

5. A method of improving the performance of a dial-up access concentrator, which comprises a shelf controller, a plurality of signal processor cards and a plurality of line cards, by caching the data created for a call connection for use in the next successively received incoming call, comprising the steps of:
    storing in a cache memory communication connection data, including hardware device setup and the communication connection data created for a call connection, that serves to interconnect an incoming call connection that appears on a one of said plurality of line cards with a one of said plurality of signal processor cards;
    detecting conclusion of a call connection on said a one of said plurality of line cards;
    abortind, in response to said call conclusion, deconstucton of the existing call connection;
    maintaining physical hardware connections that interconnect said one line card to said one signal processor card, the associated call processing and call connection resources, and the associated said communication connection data in said cache memory;
    determining, in response to receipt of a successive incoming call connection on said one line card, whether said physical hardware connection and associated stored communication connection data can be used to serve said successive incoming call connection.

6. The method of improving the performance of a dial-up access concentrator of claim 5 further comprising the step of:
    means, responsive to a determination that said communication connection and associated stored communication connection data can be used to serve said successive incoming call connection, for activating a call connection for said successive incoming call connection using said communication connection and associated communication connection data in said cache memory.

7. The method of improving the performance of a dial-up access concentrator of claim 6 further comprising the step of:
    modifying said communication connection and associated stored communication connection data to activate said call connection for said successive incoming call connection using said communication connection and associated communication connection data in said cache memory.

8. The method of improving the performance of a dial-up access concentrator of claim 5 further comprising the steps of:
    purging, in response to a determination that said communication connection and associated stored communication connection data can not be used to serve said successive incoming call connection, said communication connection data from said cache memory means; and
    deconstructing said communication connection.

9. A dial-up access concentrator comprising:
    a plurality of signal processor cards;
    a plurality of line cards, each of which is connected to a data communication link for initiating and receiving call connections with said data communication link;
    time division multiplexed means connected to and interconnecting said plurality of signal processor cards and said plurality of line cards;
    shelf controller means for managing communication connections on said time division multiplexed means among said plurality of signal processor cards and said plurality of line cards;
    cache memory means for storing communication connection data, including hardware device setup and the communication connection data created for a call connection, that defines the interconnection of an incoming call connection that appears on a one of said plurality of line cards with a one of said plurality of signal processor cards;

means for detecting conclusion of a call connection on a one of said plurality of line cards;

means, responsive to said call conclusion, for aborting deconstruction of the existing call connection;

means for maintaining physical hardware connections that interconnect said one line card to said one signal processor card, the associated call processing and call connection resources, and the associated said communication connection data in said cache memory means; and means, responsive to receipt of a successive incoming call connection on said one line card, for determining whether said physical hardware connection and associated stored communication connection data can be used to serve said successive incoming call connection.

10. The call data and hardware cache of claim 9 further comprising:

means, responsive to a determination that said communication connection and associated stored communication connection data can be used to serve said successive incoming call connection, for activating a call connection from said successive incoming call connection on said one line card to said one signal processor card using said communication connection and associated communication connection data in said cache memory means.

11. The call data and hardware cache of claim 10 further comprising:

means for modifying said communication connection and associated stored communication connection data to activate said call connection from said successive incoming call connection on said one line card to said one signal processor card using said communication connection and associated communication connection data in said cache memory means.

12. The call data and hardware cache of claim 9 further comprising:

means, responsive to a determination that said communication connection and associated stored communication connection data can not be used to serve said successive incoming call connection, for purging said communication connection and associated communication connection data from said cache memory means.

\* \* \* \* \*